(12) United States Patent
Aggarwal et al.

(10) Patent No.: US 9,984,585 B2
(45) Date of Patent: May 29, 2018

(54) METHOD AND SYSTEM FOR CONSTRUCTED RESPONSE GRADING

(71) Applicants: Varun Aggarwal, Gurgaon (IN); Vinay Shashidhar, Gurgaon (IN)

(72) Inventors: Varun Aggarwal, Gurgaon (IN); Vinay Shashidhar, Gurgaon (IN)

( * ) Notice: Subject to any disclaimer, the term of this patent is extended or adjusted under 35 U.S.C. 154(b) by 95 days.

(21) Appl. No.: 14/489,585

(22) Filed: Sep. 18, 2014

(65) Prior Publication Data

US 2015/0339940 A1 Nov. 26, 2015

(30) Foreign Application Priority Data

Dec. 24, 2013 (IN) .......................... 3745/DEL/2013

(51) Int. Cl.
*G09B 7/02* (2006.01)
*G10L 15/19* (2013.01)
*G10L 25/60* (2013.01)
*G10L 15/18* (2013.01)

(52) U.S. Cl.
CPC ................ *G09B 7/02* (2013.01); *G10L 15/19* (2013.01); *G10L 15/18* (2013.01); *G10L 25/60* (2013.01)

(58) Field of Classification Search
CPC ................................ G09B 19/06; G10L 25/60
See application file for complete search history.

(56) References Cited

U.S. PATENT DOCUMENTS

| 8,157,566 | B2* | 4/2012 | Tsai | G09B 19/06 434/156 |
| 9,401,142 | B1* | 7/2016 | Rothwell | G06Q 50/01 |
| 9,576,593 | B2* | 2/2017 | Pakhomov | G10L 25/78 |
| 2002/0160341 | A1* | 10/2002 | Yamada | G09B 5/065 434/157 |
| 2007/0048697 | A1* | 3/2007 | Du | G09B 5/04 434/156 |
| 2008/0027731 | A1* | 1/2008 | Shpiro | G09B 5/06 704/276 |

(Continued)

OTHER PUBLICATIONS

Ian Carmichael McGraw, Crowd-supervised Training of Spoken Language Systems, Submitted to the Department of Electrical Engineering and Computer Science in partial fulfillment of the requirements for the degree of Doctorate of Philosophy at the Massachusetts Institute of Technology Jun. 2012.*

(Continued)

*Primary Examiner* — Matthew Baker
(74) *Attorney, Agent, or Firm* — IP Spring

(57) ABSTRACT

A method and system for constructive response grading for spoken language is disclosed. The method and system are computer implemented and involve a crowdsourcing step to derive evaluation features. The method includes steps for posting a speech test through an automated speech assessment tool, receiving candidate responses from candidates for the speech test; delivering the candidate responses to crowdsource volunteers; receiving crowdsourced responses from crowdsource volunteers, where the crowdsourced responses comprise a transcription of the speech test; deriving features from the transcription; and deriving a individual scores based on the features, where the individual scores are representative of pronunciation score, fluency score, content organization score and grammar score of the spoken language for each candidate.

18 Claims, 3 Drawing Sheets

(56) References Cited

U.S. PATENT DOCUMENTS

| | | | | |
|---|---|---|---|---|
| 2009/0083288 A1* | 3/2009 | LeDain | .................. | G09B 19/06 |
| 2009/0258333 A1* | 10/2009 | Yu | ............................ | G09B 5/04 |
| | | | | 434/157 |
| 2014/0067367 A1* | 3/2014 | Simmons | ............. | G09B 17/003 |
| | | | | 704/8 |
| 2014/0303956 A1* | 10/2014 | Wilson | .................. | G06Q 10/06 |
| | | | | 704/2 |
| 2015/0287339 A1* | 10/2015 | Deshmukh | ............. | G09B 19/04 |
| | | | | 434/156 |

OTHER PUBLICATIONS

Litman, Diane J., and Kate Forbes-Riley. "Predicting student emotions in computer-human tutoring dialogues." Proceedings of the 42nd Annual Meeting on Association for Computational Linguistics. Association for Computational Linguistics, 2004.*

Wang, Hao, Xiaojun Qian, and Helen Meng. "Predicting gradation of L2 English mispronunciations using crowdsourced ratings and phonological rules." SLaTE. 2013.*

Neumeyer, Leonardo, et al. "Automatic text-independent pronunciation scoring of foreign language student speech." Spoken Language, 1996. ICSLP 96. Proceedings., Fourth International Conference on. vol. 3. IEEE, 1996.*

* cited by examiner

METHOD AND SYSTEM FOR CONSTRUCTED RESPONSE GRADING

This is a complete specification of the provisional application No. 3745/DEL/2013 filed on 24 Dec. 2013 with the Patent Office, India.

FIELD OF THE INVENTION AND USE OF INVENTION

The invention relates generally to the field of constructed response grading useful for streamlining candidate evaluation and more specifically to a method and system for constructed response grading using a crowdsourcing feature to generate individual scores for a candidate for spoken language evaluation.

BACKGROUND

It is well accepted that the assessment of constructed (open) response items, popularly known as subjective evaluation, provides a much more holistic and accurate assessment of a candidate's skills as compared to selected response items (multiple-choice questions). The primary limitation of a selected response item is that it asks the candidate to choose the right answer, providing implicit hints and the structure of the solution. With the recent interest in MOOCs (Massively Online Open Courseware), scalable education/training and automated recruitment assessment, the interest in automating the assessment of constructed responses has increased manifolds.

There are many examples of successfully using machine learning for constructed response grading. However, the machine learning framework falls short of providing accurate assessment for a number of problems. Secondly, these automated approaches have come under criticism since the test-takers can fake high-scoring responses. For instance, automated assessment of free speech for spoken language skills largely remains an unsolved problem, while on the other hand, it has been shown that automatic essay grading algorithms can be tricked by inserting the right words in random order or writing long essays. One of key limitations of the current techniques is the inability to automatically derive the right set of features with high precision for assessing the response.

In some prior art techniques, the crowd/peers directly evaluates/grades the response from candidates on a rubric and a combination of their grades mimics the grades given by experts. Firstly, these crowd-based approaches do not work for evaluating expert tasks, say a computer program or an advanced electronics question, which the crowd cannot grade with any precision. Secondly, though useful for low-stake scenarios, these techniques continue to be suspect with regard to crowd reliability and drift for mid/high stake assessments.

SUMMARY OF THE INVENTION

In one aspect the invention provides a constructive response grading method for spoken language grading, the method is implemented using a computer processor and includes instructions for the following steps: posting a speech test through an automated speech assessment tool; receiving candidate responses from candidates for the speech test; delivering the candidate responses to crowdsource volunteers; receiving crowdsourced responses from crowdsource volunteers, wherein the crowdsource responses comprise a transcription of the speech test; deriving features such as speech and language features for example, force alignment features and natural language processing features from the transcription; and deriving individual scores and a composite score for each candidate response that is based on the crowd grade, force alignment features and natural processing features.

In another aspect, a system for constructive response grading is provided that is implemented using a computer processor. The system includes a speech test module for storing and posting a speech test; a candidate response module for receiving and storing candidate responses from candidates for the speech test; a crowdsource module for delivering the candidate responses to crowdsource volunteers, receiving crowdsourced responses from crowdsource volunteers and storing the crowdsourced responses, wherein the crowdsourced responses comprise a transcription of the speech test; a machine learning module for deriving speech and language features from the transcription; and a score generator module for deriving individual scores and a composite score for each candidate response using the speech and language features.

DRAWINGS

These and other features, aspects, and advantages of the present invention will become better understood when the following detailed description is read with reference to the accompanying drawings in which like reference numerals represent corresponding parts throughout the drawings, wherein.

DETAILED DESCRIPTION OF THE INVENTION

Figure 1:
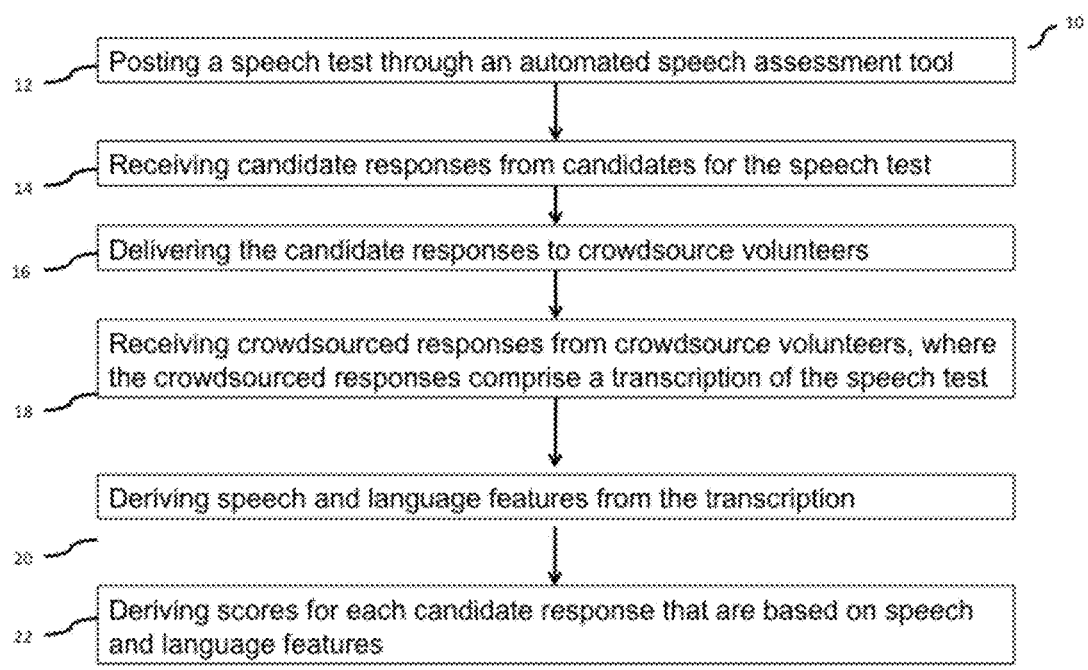
FIG. 1 is a flowchart showing exemplary steps for a constructive response grading method for spoken language grading.

As used herein and in the claims, the singular forms "a," "an," and "the" include the plural reference unless the context clearly indicates otherwise.

Free speech as used herein refers to text-independent speech samples. Here, the text of the speech is not known apriori.

Volunteer as used herein refers to a person who volunteers to attempt a task posted on an online platform like Amazon® Mechanical Turks for no or a pre decided remuneration. Volunteer is also referred as a worker and has the right to choose the task he/she might want to attempt.

The method and system described herein are related to constructed response grading environment which involves machine or automated evaluations of candidate responses. The invention advantageously includes a step for identifying human intelligence evaluation tasks in the feature derivation step and posts these tasks to be completed by a non-expert crowd. The response from the human intelligence tasks are then used to create relevant features for machine learning and evaluation.

The technique described herein recognizes that many evaluation features can be easily derived by (or with help of) humans, even if they are non-experts. For instance, word sense disambiguation or gibberish identification for essay grading, text transcription from noisy handwriting and speech transcription for speech grading are all easily doable tasks by humans through crowdsourcing. With this insight, the invention provides an extended machine learning framework with a crowdsourcing layer for constructed response assessment (also called herein the MLCS approach). This technique reduces (or eliminates) the chance of test-taker faking high-scoring responses, which is easily identifiable by non-expert humans. The technique described herein is in contrast to other peer grading methods or crowdsourcing assessments. The present technique uses crowd for the human-intelligence tasks in the grading process, allowing it to be useful for grading expert tasks and also, be more acceptable in mid/high stake scenarios.

Thus the invention provides a framework to add a crowdsourcing step for feature derivation in a machine learning based constructed response grading systems. The free-speech can be graded with high accuracy with this approach in contrast with a pure machine learning approach. The features derived from crowdsourced transcription are better or equal in predicting expert grades than crowd-grades, but crowd-grades add additional value over and above the transcription features towards prediction of expert grades.

The invention enables a scalable and accurate way to do spoken language assessment, for example but not limited to spoken English, using the above technique which is a huge requirement in industry. The invention is used to assess the quality of a spoken language of candidates based on their speech samples. The evaluation of the free speech sample is the primary task and includes speech evaluation of second language learners of various backgrounds, regions, dialects and education qualifications.

The output of the evaluation is an overall composite spoken language score for the candidate, which is a function of their pronunciation, fluency, content organization and grammar. The invention uses a five point rubric, prepared with expert advice, for the composite score. Broadly speaking, 'Pronunciation' refers to the correctness in the utterance of the phonemes of a word by the candidates as per neutral accent. 'Fluency' refers to the rate at which the speech is said along with the presence or absence of hesitations and false starts and stops etc. 'Content organization' measures the candidate's ability to structure the information disposition and present is coherently. 'Grammar' measures how much of the language syntax was followed by the candidate.

The speech samples of the candidates are collected using an automated speech assessment tool that is made available over phone as well as on computer. The test has multiple sections, where the candidate has to do the following: read sentences, listen and repeat sentences, listen to passage or conversation and answer multiple choice question and finally a free speech section. In the free speech section, the candidate is provided with the topic and given 30 seconds to think and take notes and then speak about the topic for 45 seconds. The topic is repeated twice to ensure task clarity. The test takes 16-20 minutes to complete depending upon the test version.

The invention uses speech and language features classes for evaluation, three such features are described below in more detail. It may be appreciated by those skilled in the art that other such features may also be used depending on evaluation criterion.

Three classes of features are used—grades from the crowd (crowd grades), Force Alignment features (FA) and Natural Language Processing (NLP) features. The free speech samples are posted to the crowd to get transcription and grades from them. The crowd grades become one set of features. A second set of features, FA features, are derived by aligning the speech sample on the crowdsourced transcription. A third set of features, NLP features, are directly derived from the crowdsourced text. Each of these features are explained herein below in more detail.

Crowd Grades: The crowd or the non-experts (also referred as crowdsource volunteer) provides their score on each of the following—pronunciation, fluency, content organization and grammar apart from transcribing the speech. They are provided with a simplified version of the five point rubric used by experts. These grades are combined to form a total composite grade per crowdsource volunteer per candidate. These are further combined across crowdsource volunteer to give a final trait grade for each trait per candidate. The final trait grades are combined by taking mean/consensus to give one final crowd grade.

Force Alignment features: The speech sample of the candidate is forced aligned onto the crowdsourced transcription using the HTK [Hidden Markov Model Toolkit] speech recognizer. A number of speech quality features are derived, which include, rate of speech, position and length of pauses, log likelihood of recognition, posterior probability, hesitations and repetitions, etc. These features are theoretically predictive of the pronunciation and fluency of the candidate. All the crowdsourced transcriptions are considered and combined to produce a more accurate transcription and quality features derived which are then used to evaluate the candidate sample.

NLP features: These are features that predict the content quality (content organization) and grammar of the spoken content. For this purpose, standard NLP packages are used and the crowdsourced transcription is used as an input to them. The package calculates surface level features such as number of words, complexity or difficulty of words, number of common words used, and also, semantic features like the coherency in text, context of the word spoken, sentiment of the text and grammar correctness. These features are theoretically predictive of the grammar and content organization of the candidate.

An exemplary crowdsourcing framework used as input to machine learning methods is described herein below.

The free speech sample was given to a crowd to transcribe and their judgment of the spoken English quality was also captured. The task was posted on a popular crowdsourcing platform—Amazon Mechanical Turk (AMT). A clean and simple interface was provided to the crowdsource volunteers with standard features needed for transcription. Also an advanced audio player was embedded with ability to play the speech sample in repeat mode, rewind, forward apart from standard play pause to help the crowdsource volunteer. The different transcriptions were combined using a transcription combination algorithm such as a ROVER algorithm.

Several methods have been used in the past for increasing reliability of grades given by crowd by identifying/correcting any biases and remove responses from non-serious/low quality crowdsource volunteers. One of the key techniques for this include inserting gold standard tasks with known answers to get an estimate of the crowdsource volunteer's ability.

In the exemplary method a risk is assigned to a crowdsource volunteer based on his/her performance on gold standards. There are different risk levels and based on gold standard performance, the states are changed to high/low risk levels. The frequency of gold standards shown to a crowdsource volunteer are also a function of the current risk of the crowdsource volunteer: high in case of high risk and low otherwise. At a high risk, i.e. detection of work of sub-standard, a notification is sent to the crowdsource volunteer with suggested corrective course of action. Beyond a certain level, the crowdsource volunteer is barred from attempting future evaluation. This approach allows to control quality of crowdsourced volunteers, provide feedback, remove crowdsource volunteers and also control the balance between real and gold standard tasks. Using this system to check the accuracy of the crowdsource volunteer by giving him gold standards and baring him/her from the system in case performance degrades is done to ensure system integrity.

Crowd Sourced response comprise of a transcription of the speech sample. They may also include crowd grades on the candidate response based on a predetermined response. It may also include any other input like if the candidate has spoken as desired etc.

FIG. 1 is an exemplary flowchart 10 that shows the key steps of the constructive response grading method for spoken language grading described herein above. The method includes a step 12 for posting a speech test through an automated speech assessment tool; a step 14 for receiving candidate responses from candidates for the speech test; a step 16 for delivering the candidate responses to crowdsource volunteers; a step 18 for receiving crowdsourced responses from crowdsource volunteers, where the crowdsourced responses comprise a transcription of the speech test. The crowdsource response may also include a crowd grade on the candidate responses based on a pre-determined rubric, and may include any other input useful for evaluating the candidate response such as if the candidate has spoken as desired or not. A step 20 for deriving speech and language features such as force alignment features and natural language processing features from the transcription; and step 22 for deriving individual scores and in some cases a composite score for each candidate response that is based on the crowd grade, force alignment features and natural processing features, and where the individual scores are pronunciation score, fluency score, content organization score and grammar score of the spoken language for each candidate. The method includes additional steps for displaying the these scores and communicating the scores to another device or a user interface.

Figure 2:
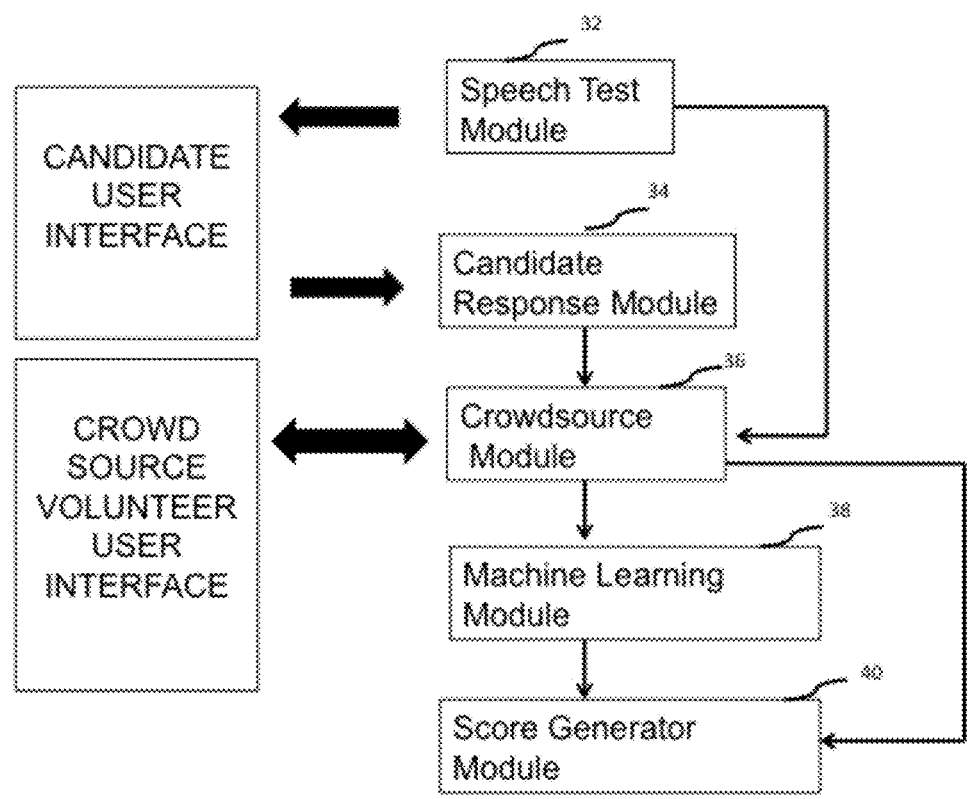
FIG. 2 is a diagrammatic representation for a constructive response grading system that implements the method of FIG. 1.

The method described herein above is implemented using computer processing components that provide a system for constructive response grading as shown in FIG. 2. The system 30 includes various modules that implemented using computer processing language that process and transform the data based on instructions embedded in the computer processing language. These modules include a speech test module 32 for storing and posting a speech test; a candidate response module 34 for receiving and storing candidate responses from candidates for the speech test; a crowdsource module 36 for delivering the candidate responses to crowdsource volunteers, receiving crowdsourced responses from crowdsource volunteers and storing the crowdsourced responses, wherein the crowdsourced responses comprise a transcription of the speech test and in some cases a crowd grade on the candidate responses based on a pre-determined rubric; a machine learning module 38 for deriving speech and language features such as but not limited to force alignment features and natural language processing features from the transcription; and a score generator module 40 for deriving individual scores and additionally if required a composite score for each candidate response that is based on the crowd grade, force alignment features and natural processing features, and where the individual scores are pronunciation score, fluency score, content organization score and grammar score of the spoken language for each candidate. The system also includes a user interface to display the individual scores and the composite score for each candidate. The system also includes a communication interface to communicate the individual scores and composite score to an external communication device such as a mobile phone or a computer using electronic mail, short messaging service or any other communicating means.

Figure 3:
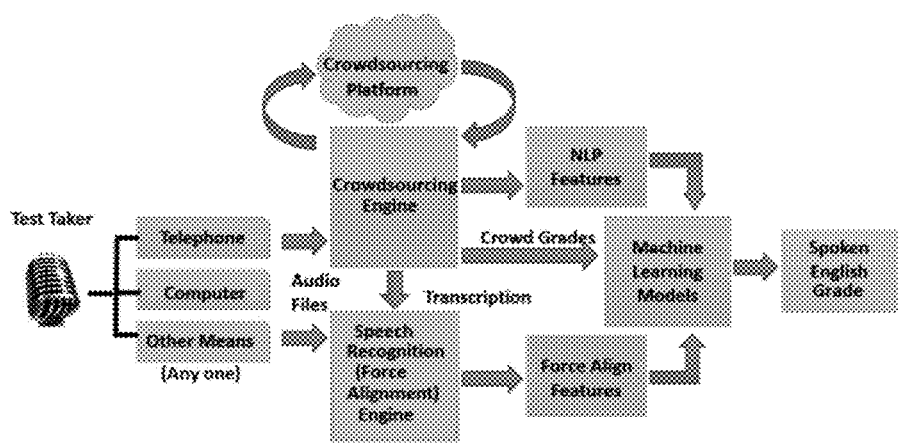
FIG. 3 is a diagrammatic representation of an exemplary implementation of the system and method for an English language evaluation.

FIG. 3 is a diagrammatic representation of an exemplary implementation of the method and system of the invention for evaluation of free speech. A task of transcription of the sample speech was posted, which in one example is a hard computer science problem, to the crowd. Once, a fairly accurate transcription from the crowd was received, force-aligning was done of the speech of the candidate on this text to derive various features which went into a machine learning engine. Non-expert grades of the speech were collected from the crowd, which were optionally used as additional features. With these accurately identified features with the help of the crowd, machine learning (specifically the modeling step) became a powerful technique for constructed response grading.

The experimental setup and the results are described in the next section.

EXPERIMENTS

The experiments were conducted to inquire the following questions:
  How accurately does a pure machine learning approach (without crowdsourced transcription) predict grades as compared to grades given by human experts?
  How much better is the method and system of the invention in predicting grades compared to a pure ML (machine learning) approach and direct grades provided by the crowd?
  Do direct grades by the crowd add additional value in grade prediction over and above features derived in the system and method of the invention?

Experiments were conducted on 176 free speech samples which were graded by expert assessors. To answer the questions stated above, different sets of features were used to develop models and to compare their accuracy. The method and system of the invention was compared with four machine learning techniques—Ridge Regression, Random Forests, SVMs and Neural Networks with different features selection techniques. The details of data sets used in the experiments is described below:

Data Sets

The data set had 176 free speech responses. The speech samples were from seniors (non-native English speakers) pursuing bachelors degree in India. Candidates were asked to speak on one of the following topics: describe the scene of hospital, describe the scene of flood, describe the scene of crowded market and describe the scene of school playground. They were given 30 seconds to think, take notes and then provided with 45 seconds to speak. The responses were collected on phone through an automated assessment tool. Apart from the free speech response, each candidate read 12 given sentences and repeated 9 given sentences immediately after listening to each. Any empty or very noisy responses (not humanly discernible) were removed from the data set.

These responses were graded on an overall composite score by two experts who had more than fifteen years of experience in grading spoken English responses. The correlation between grades given by both experts was 0.85.

The data set was split into two sets: training and validation. The train-set had 75% of the sample points whereas the validation-set had 25%. The split was done randomly making sure that the grade distribution in both the sets are similar.

Crowdsourced Tasks

The 176 speech sample assessment task was posted on Amazon Mechanical Turk (AMT). Each task was completed by three raters (crowdsource volunteers, also referred as "worker").

The task took on an average, 8-9 minutes to attempt and the crowdsource volunteer was paid between 6 cents-10 cents per task including bonus which was paid on completion of every 4 tasks. The average transcription accuracy of transcribed speech for the crowdsource volunteer was 82.4%. This was significantly improved to 95% when the transcription of the three crowdsource volunteers were combined using ROVER algorithm. In total, 71 unique crowdsource volunteer completed the tasks.

Regression Modeling

The feature selection was followed by regression with four-fold cross-validation to model the grades. Linear ridge-regression, Random Forests, Neural Networks and SVM-regression were used with different kernels to build the models. The least cross-validation error was used to select the models. Some simple techniques for features selection were used, which iterates over feature set and selects top or critical features having orthogonal information over set of selected features.

Regression parameters: For linear regression with regularization, the optimal ridge coefficient $\lambda$ was selected by varying it between 1 and 1000 and selecting the parameter which gave the least RMS error in cross-validation. For Random Forests, n estimators between 1 and 100 were varied and maximum depth parameter was between 1 and 10. For support vector machines two kernels were tested: linear and radial basis function. In order to select the optimal SVM [Support Vector Machine] model, the penalty factor C, parameters $\gamma$ and $\varepsilon$, the SVM kernel and the selected set of values were varied that gave the lowest RMS error in cross-validation. The Neural Networks model had one hidden layer and 5 to 10 neuron.

The experiments were done on five sets of features: first, features generated by automatic speech transcription of free speech (pure ML approach); second, a set features generated by force aligning read/repeated by candidates; third, a set of features pertaining to grades given by the crowd; fourth, a set of features generated by force aligning free speech on crowdsourced transcription and NLP features from crowdsourced transcriptions (MLCS approach) and the fifth, all features together with grades given by crowd (the method and system of the invention).

In the following subsection, the features pertaining to read sentences and listen sentences are referred to RS/LR features, the features pertaining to MLCS approach are referred to as MLCS features, features pertaining to natural language processing on crowdsourced transcription are referred as NLP features while those pertaining to crowd grades are referred as crowd grades.

Observations

The results of the experiment are tabulated in Table 1. There are results for the models selected according to least cross-validation error. The Pearson coefficient of correlation (r) for the different models is reported. The best cross-validation error in case of SVMs was obtained using the linear kernel.

All the following observations are based on the validation error. Ridge regression and SVMs show the best results, Random Forests and Neural Networks have mixed results. The broad trends across feature-sets remain similar across modeling techniques.

It was found that the two ML only based approaches (Pure ML, RS/LR) do worse than all crowd-based approaches by 0.15 to 0.35 correlation points. In all cases, the MLCS features do equivalent or better than the crowd grades up to 0.05 correlation points. This shows the superiority of the MLCS approach as compared to the crowd grades approach. The MLCS approach provides a correlation ranging 0.70-0.75 with the expert grades. When, the MLCS features are combined with crowd grades, a higher total correlation in all cases. This shows that the crowd grades provide some orthogonal information as compared to the MLCS features, towards predicting the grade given by experts. For ridge regression and SVMs, validation r is 0.83, which rivals the agreement of experts (0.85) and those observed in automatic essay grading. It is also observed that RS/LR features does not possess any orthogonal information as compared to MLCS features with crowd grades. This makes the technique commensurate to be used in high-stake test setting.

These observations clearly show that the MLCS approach performs much better than the ML only approach. We also find that the MLCS approach does better than crowd grades. We finally show that combining MLCS features with crowd grades provide the best results.

TABLE 1

Regression Results

| Technique | Feature Type | Model Code | Train r | Validation r |
| --- | --- | --- | --- | --- |
| Ridge Regression | Pure ML | RR-PML | 0.44 | 0.44 |
| | RS/LR | RR-RS.LR | 0.59 | 0.52 |
| | Crowd Grades | RR-R | 0.67 | 0.68 |
| | ML-CS | RR-ML.CS | 0.65 | 0.68 |
| | All | RR-All | 0.80 | 0.83 |
| Random Forests | Pure ML | RF-PML | 0.81 | 0.30 |
| | RS/LR | RF-RS.LR | 0.66 | 0.46 |
| | Crowd Grades | RF-R | 0.71 | 0.66 |
| | ML-CS | RF-ML.CS | 0.78 | 0.68 |
| | All | RF-All | 0.88 | 0.78 |
| SVM | Pure ML | SVM-PML | 0.52 | 0.40 |
| | RS/LR | SVM-RS.LR | 0.59 | 0.52 |
| | Crowd Grades | SVM-R | 0.65 | 0.67 |
| | ML-CS | SVM-ML.CS | 0.63 | 0.70 |
| | All | SVM-All | 0.80 | 0.83 |
| Neural Networks | Pure ML | NN-PML | 0.58 | 0.38 |
| | RS/LR | NN-RS.LR | 0.59 | 0.56 |
| | Crowd Grades | NN-R | 0.78 | 0.63 |
| | ML-CS | NN-ML.CS | 0.78 | 0.68 |
| | All | NN-All | 0.78 | 0.78 |

Thus the experiments prove that the constructed response grading by pure machine learning approaches are unable to accurately mimic expert grades. The invention provides a system and method that combines machine learning with crowdsourcing. This entails identifying human intelligence tasks in the feature derivation step and using crowd-sourcing to get them completed. A much more accurate set of features makes machine learning powerful and enables it to solve unsolved constructed response grading problems. In contrast to peer/crowd grading techniques, the method described herein is not influenced by rater drift and could be used for grading.

Thus the described embodiments and methods of the invention improve the machine learning evaluation methods for evaluating spoken language responses of candidates by introducing a step for identifying and using human-intelligence evaluation tasks and receiving responses from crowd to complete these evaluation tasks in an accurate and reliable way that can be used in a machine learning environment. This makes machine learning an adequate technique to solve unsolved problems as described herein above.

Further, the invention provides a method and system for constructive response grading that generates individual scores and in a specific embodiment, additionally, a composite score for a candidate response for spoken language evaluation which are a function of their pronunciation, fluency, content organization and grammar that in turn are based on crowdsourcing features.

The system and method of the invention may be accessible through an application interface on a networked computer or through any other electronic and communication device such as a mobile phone connected via wires or wirelessly which may use technologies such as but not limited to, Bluetooth, WiFi, Wimax. In one example the system and method of the invention are implemented through a computer program product residing on a machine readable medium, where the computer program product is tangibly stored on machine readable media.

The different users (candidates, crowdsource volunteers, administrators, and others) may enter or communicate data or request through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, pointing stick.

The described embodiments may be implemented as a system, method, apparatus or article of manufacture using standard programming or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

A computer program code for carrying out operations or functions or logic or algorithms for aspects of the present invention may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic .NET, Visual C++, Visual C#.Net, Python: Delphi, VBA, Visual C++.Net, Visual FoxPro, YAFL, XOTcl, XML, Wirth, Water, Visual DialogScript, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective Caml, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Id, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, Caml, Blue, Bistro, Bigwig, BETA, Befunge, BASIC, Awk, Assembly, ASP, AppleScript, APL, Algol 88, Algol 60, Aleph, ADL, ABEL, ABC, or similar programming languages or any combination thereof.

The different modules referred herein may use a data storage unit or data storage device that is selected from a set of but not limited to USB flash drive (pen drive), memory card, optical data storage discs, hard disk drive, magnetic disk, magnetic tape data storage device, data server and molecular memory.

A computer network may be used for allowing interaction between two or more electronic devices or modules, and includes any form of inter/intra enterprise environment such as the world wide web, Local Area Network (LAN), Wide Area Network (WAN), Storage Area Network (SAN) or any form of Intranet.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A computer implemented constructive response grading method for spoken language grading, the method implemented using a processor, the method comprising:
collecting, through a communication network, electronically recorded speech samples, wherein the electronically recorded speech samples include a plurality of responses of one or more candidates from a plurality of data processing devices associated with the one or more candidates;

providing, by a crowdsourcing engine, the electronically recorded speech samples to crowdsource volunteers;

receiving, by the crowdsourcing engine, a crowdsourced transcription and crowd scores from each of the crowdsource volunteers for one or more of a plurality of features for each of the plurality of responses of the one or more candidates, wherein the plurality of features are a function of pronunciation, fluency, content organization, and grammar;

automatically combining, with a transcription combination algorithm, crowdsourced transcriptions from each of the crowdsource volunteers to form a combined transcription;

generating, by a feature generation module, for each of the plurality of responses of the one or more candidates, individual scores for a first feature generated pertaining to grades given by the crowdsource volunteers and second features generated by force aligning free speech on the crowdsourced transcriptions and natural language processing features from the crowdsourced transcriptions;

generating, by a machine learning module, a composite score for each of the plurality of responses of the one or more candidates based on the individual scores for each of the plurality of features together with the crowd scores given by the crowdsource volunteers;

communicating the individual scores for each of the plurality of features and the composite score through a communication interface to each candidate of the one or more candidates;

providing the crowdsource volunteers with gold standard tasks with known answers;

comparing crowdsource answers from the crowdsource volunteers to the known answers;

assigning a respective risk level to each of the crowdsource volunteers based on a comparison of the crowdsource answers to the known answers; and responsive to the respective risk level exceeding a predetermined risk threshold, automatically removing a corresponding crowdsource volunteer from evaluations of the electronically recorded speech samples.

2. The method of claim 1, wherein the plurality of features further comprises a cluster of force alignment features, speech prosody features, and the natural language processing.

3. The method of claim 2, further comprising deriving the plurality of features from the crowdsourced transcriptions and the electronically recorded speech samples.

4. The method of claim 3 wherein the plurality of features further include prosody and content organization.

5. The method of claim 1 further comprising:

responsive to the respective risk level exceeding the predetermined risk threshold, sending a notification to a corresponding crowdsource volunteer wherein the notification includes a suggested corrective course of action.

6. The method of claim 1, wherein the machine learning module uses the crowdsourced transcriptions and the crowd scores to improve the combined transcription, the individual scores, and the composite score based on machine learning.

7. A system for constructive response grading implemented using a hardware processor, the system comprising:

a memory having computer readable instructions stored therein; and a candidate response module stored in the memory and operable to receive electronically recorded speech samples, wherein the electronically recorded speech samples include a plurality of responses of one or more candidates from a plurality of data processing devices associated with the one or more candidates, wherein the plurality of responses are stored in the memory;

a crowdsourcing engine stored in the memory and operable to (1) provide the electronically recorded speech samples to crowdsource volunteers and (2) receive a crowdsourced transcription and crowd scores from each of the crowdsource volunteers for one or more of a plurality of features for each of the plurality of responses of the one or more candidates, wherein the plurality of features are a function of pronunciation, fluency, content organization, and grammar;

a force alignment engine stored in the memory and operable to automatically combine, with a transcription combination algorithm, crowdsourced transcriptions from each of the crowdsource volunteers to form a combined transcription;

a feature generation machine learning module stored in the memory and operable to generate, for each of the plurality of responses of the one or more candidates, individual scores for a first feature pertaining to grades given by the crowdsource volunteers and second features generated by force aligning free speech on the crowdsourced transcriptions and natural language processing features from the crowdsourced transcriptions, a machine learning module stored in the memory and operable to (1) generate a composite score for each of the plurality of responses of the one or more candidates based on the individual scores for each of the plurality of features together with the crowd scores given by the crowdsource volunteers, (2) communicate the individual scores and the composite score through a communication interface to each candidate of the one or more candidates; (3) provide the crowdsource volunteers with gold standard tasks with known answers; (4) compare crowdsource answers from the crowdsource volunteers to the known answers; (5) assign a respective risk level to each of the crowdsource volunteers based on a comparison of the crowdsource answers to the known answers; and (6) responsive to the respective risk level exceeding a predetermined risk threshold, automatically remove a corresponding crowdsource volunteer from evaluations of the electronically recorded speech samples.

8. The system of claim 7, further comprising a candidate user interface to display the individual scores and the composite score for each candidate.

9. The system of claim 7, further comprising a crowdsource volunteer user interface that provides the electronically recorded speech samples to the crowdsource volunteers and that receives the crowdsourced transcriptions and the crowd scores from the crowdsource volunteers.

10. The system of claim 7, further comprising a microphone that records speech samples and stores the speech samples as the electronically recorded speech samples.

11. The system of claim 7, wherein the force alignment engine is further operable to perform force alignment on the crowdsource transcriptions to derive speech quality features from the crowdsourced transcriptions and wherein the individual scores and the composite score are further based on the speech quality features.

12. The system of claim 11, wherein the speech quality features include one or more of a rate of speech, a position and length of a pause, a likelihood of recognition, a posterior probability, a hesitation, and a repetition.

13. The system of claim 7, wherein the machine learning module is further operable to derive the natural language processing features from the crowdsourced transcriptions.

14. The system of claim 13, wherein the natural language processing features include one or more of a number of words, a complexity of words, a difficult of words, a number of common words used, coherency in text, a context of a word spoken, a sentiment of a word, and a correctness of grammar.

15. A computer implemented method comprising:
collecting, by a candidate response module, one or more electronically recorded speech samples from a candidate, wherein the one or more electronically recorded speech samples include responses from the candidate;
providing, by a crowdsourcing engine, the one or more electronically recorded speech samples to crowdsource volunteers;
receiving, by the crowdsourcing engine, crowdsourced transcriptions and crowd scores from each of the crowdsource volunteers, wherein each of the crowd scores is based on a feature, the features being a function of pronunciation, fluency, content organization, or grammar;
automatically combining, with a transcription combination algorithm, the crowdsourced transcriptions to form a combined transcription;
generating, by a feature generation module, for each of the responses from the candidate, individual scores for a first feature generated pertaining to grades given by the crowdsource volunteers and second features generated by force aligning free speech on the crowdsourced transcriptions and natural language processing features from the crowdsourced transcriptions;
generating, by a machine learning module, a composite score based on the individual scores together with the crowd scores given by the crowdsource volunteers;
communicating the individual scores and the composite score through a communication interface;
providing the crowdsource volunteers with gold standard tasks with known answers;
comparing crowdsource answers from the crowdsource volunteers to the known answers;
assigning a respective risk level to each of the crowdsource volunteers based on a comparison of the crowdsource answers to the known answers; and
responsive to the respective risk level exceeding a predetermined risk threshold, automatically removing a corresponding crowdsource volunteer from evaluations of the electronically recorded speech samples.

16. The method of claim 15, wherein a force alignment engine combines the crowdsourced transcriptions to form the combined transcription.

17. The method of claim 15, wherein the machine learning module uses the crowdsourced transcriptions and the crowd scores to improve the combined transcription, the individual scores, and the composite score based on machine learning.

18. The method of claim 15, further comprising:
performing, by a speech recognition engine, force alignment on the crowdsource transcriptions to derive speech quality features from the crowdsourced transcriptions.

* * * * *

UNITED STATES PATENT AND TRADEMARK OFFICE
CERTIFICATE OF CORRECTION

PATENT NO. : 9,984,585 B2  
APPLICATION NO. : 14/489585  
DATED : May 29, 2018  
INVENTOR(S) : Aggarwal et al.

Page 1 of 1

It is certified that error appears in the above-identified patent and that said Letters Patent is hereby corrected as shown below:

In the Claims

In Column 11, Line 48, Claim 2, please delete "ing." and insert -- ing features. -- therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*